Figure 1:
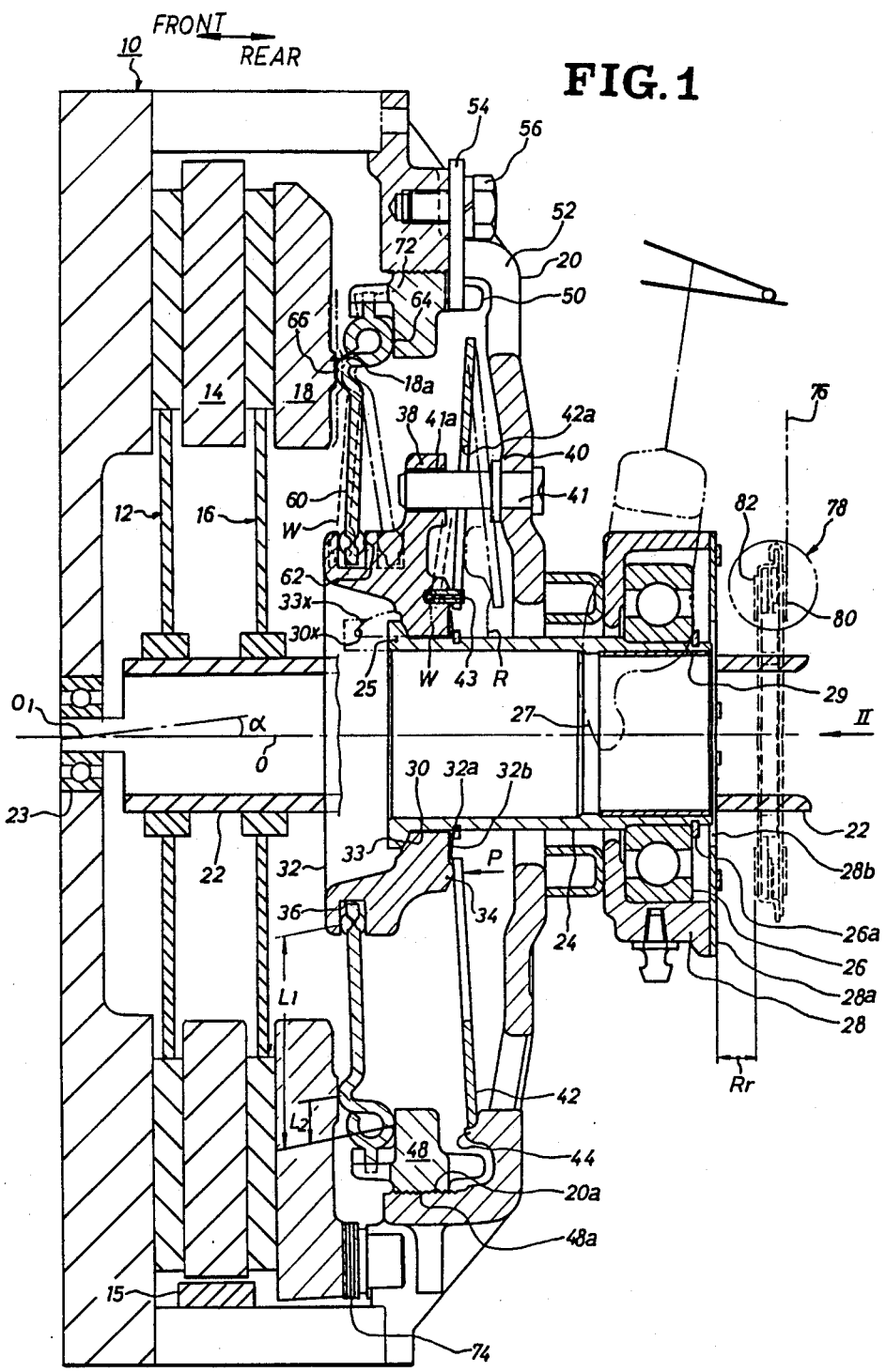

United States Patent [19]

Kitano et al.

[11] Patent Number: 4,890,708
[45] Date of Patent: Jan. 2, 1990

[54] CLUTCH HAVING AN ADJUSTABLE LEVER MATING WITH A DIAPHRAGM SPRING

[75] Inventors: Seiichi Kitano; Masaaki Asada, both of Neyagawa, Japan

[73] Assignee: Kabushiki Kaisha Daikin Sesisakusho, Neyagawa, Japan

[21] Appl. No.: 221,828

[22] PCT Filed: Oct. 5, 1987

[86] PCT No.: PCT/JP87/00746
§ 371 Date: Jun. 14, 1988
§ 102(e) Date: Jun. 14, 1988

[87] PCT Pub. No.: WO88/03233
PCT Pub. Date: May 5, 1988

[30] Foreign Application Priority Data
Oct. 21, 1986 [JP] Japan ............... 61-251324

[51] Int. Cl.⁴ .................................. F16D 19/00
[52] U.S. Cl. ........................ 192/70.3; 192/98; 192/99 A
[58] Field of Search ............ 192/70.29, 70.3, 98, 192/99 A, 110 R; 403/253, 254, 263

[56] References Cited
U.S. PATENT DOCUMENTS

| | | | |
|---|---|---|---|
| 3,424,288 | 1/1969 | Sink | 192/70.29 |
| 3,741,361 | 6/1973 | Brandenstein | 192/98 |
| 3,948,371 | 4/1976 | Lönne | 192/98 |
| 4,034,836 | 7/1977 | Sink et al. | 192/99 A |
| 4,117,917 | 10/1978 | Lapin et al. | 192/98 |
| 4,327,823 | 5/1982 | Müller et al. | 192/98 |
| 4,534,458 | 8/1985 | Ladin | 192/98 |
| 4,720,002 | 1/1988 | Kitano et al. | 192/70.3 |
| 4,754,860 | 7/1988 | Fukutake et al. | 192/70.3 |

FOREIGN PATENT DOCUMENTS

| | | |
|---|---|---|
| 15046 | 4/1971 | Japan . |
| 297543 | 12/1987 | Japan . |
| 218724 | 9/1987 | United Kingdom ............... 192/99 A |

Primary Examiner—Leslie A. Braun
Assistant Examiner—Nicholas Whitelaw
Attorney, Agent, or Firm—Armstrong, Nikaido, Marmelstein, Kubovcik & Murray

[57] ABSTRACT

This invention relates to a pull-type clutch carrying out a releasing operation by pulling a release bearing (26) away from a flywheel (10) by means of a release lever (27) interconnected to a clutch pedal, in which a spherical surface (30) is provided on a flanged portion (25) of a sleeve (24) and a spherical seat (33) is provided on a retainer (32).

Accordingly, a deflection angle ($\alpha$) can be absorbed by the spherical surface (30) and the spherical seat (33) so that the flanged portion (25) of the sleeve (24) can be made contact with the retainer (32) smoothly over the entire circumference.

10 Claims, 9 Drawing Sheets

CLUTCH HAVING AN ADJUSTABLE LEVER MATING WITH A DIAPHRAGM SPRING

INDUSTRIAL USEFUL FIELD

This invention relates to a pull-type clutch in which the clutch is released by pulling a release bearing toward the transmission side of the clutch by means of a release lever interconnected to a clutch pedal.

BACKGROUND ART

Figure 5:
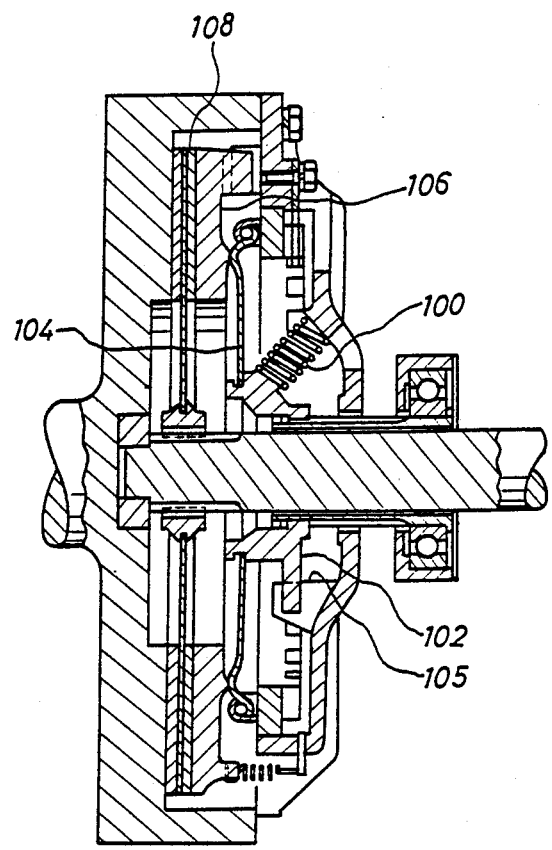

As illustrated in FIG. 5, a conventional clutch of the pull type is so constructed that a coil spring 100 disposed in an inclined position is used as a loading member to transmit spring force to a retainer 102, and a pressing force on a clutch disc 108 is exerted from the retainer 102 through a lever 104 to a pressure plate 106. (Japanese Patent Publication No. 46-15046).

However, this clutch has a disadvantage that the spring 100 makes a clutch pedal treading force increase with an increase in a pedal stroke so as to increase a pedal treading force at time when the clutch is released.

Further, this clutch has a disadvantage that the coil spring 100 is compressed by a centrifugal force acting on the coil spring 100 at a high speed rotation, so that the spring force on the pressure plate 106 is reduced.

On the other hand, the applicant of the present invention had developed the clutch which had been able to dissolve these disadvantages involved in such pull-type clutch and already applied it for the patent (application No. 61-142140, Date of application: 17th, June, 1986 and corresponding U.S. patent application Ser. No. 173,528, filed Feb. 17, 1988).

Figure 6:
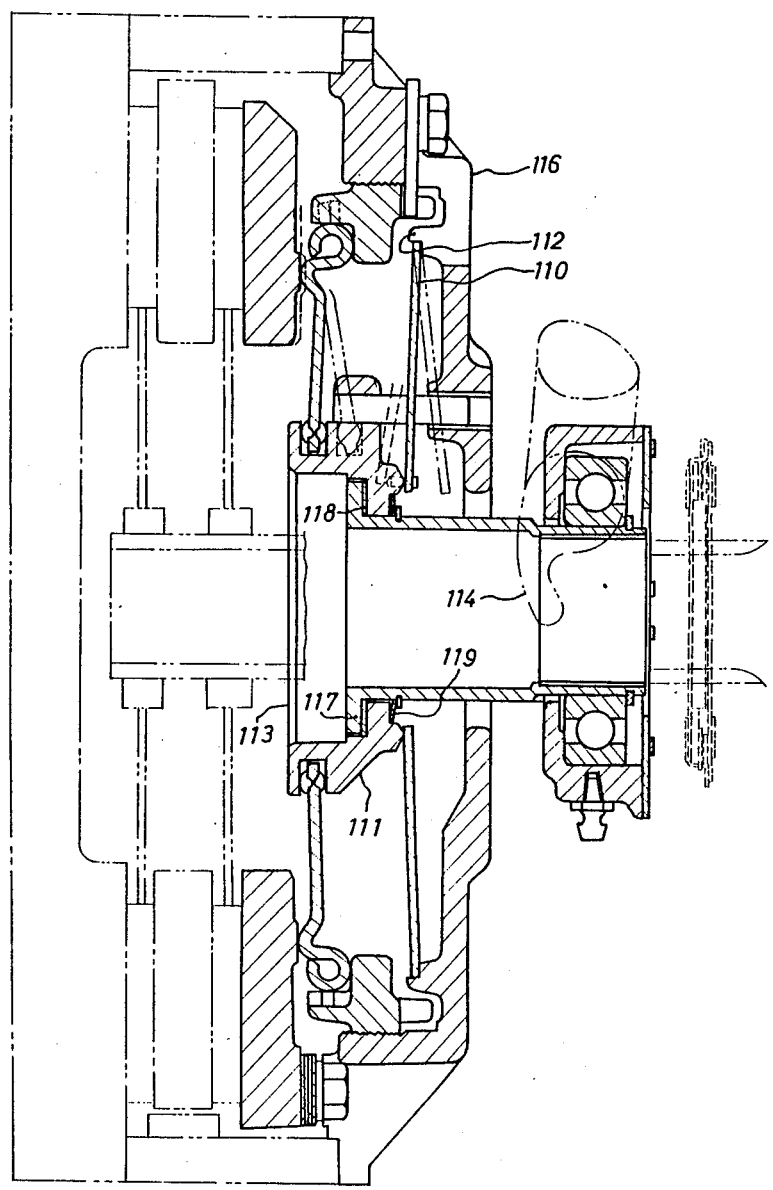

In this prior application, as illustrated in FIG. 6, a diaphragm spring 110 is used and an outer peripheral part of this diaphragm spring 110 is fitted in an annular projection 112 to allow a clutch cover 116 to hold the diaphragm spring 110.

Moreover, a retainer 111 is pressed on a flanged portion 117 of a sleeve 113 by means of a spring force of a coned disc spring 119 through a thrust force transmitting member 118.

However, in the event when the sleeve 113 is not coaxial with the retainer 111, especially when the axes of sleeve 13 and retainer 111 are not parallel with each other, the eccentricity or deflection can not be absorbed so that so-called misalignment occurs and only some parts contact each other.

When the misalignment arises, a vibration is transmitted from the retainer 111 to the sleeve 113 and a release lever 114 and finally to a clutch pedal (not shown) interconnected to the release lever 114. Thus, driver feels uncomfortable when he depresses the clutch pedal.

The vibration level is particularly large when the foot is placed on the clutch pedal under idle conditions. The vibration will gradually moderated when the engine speed is increased. Further when the engine rotation speed is increased, while depressing on the clutch pedal for changing gear ratio, the vibration is enlarged and increases the discomfort.

DISCLOSURE OF THE INVENTION

In a so-called pull-type clutch, an object of the invention is to provide a clutch which prevents vibration caused by a misalignment between a sleeve and a retainer.

Other features and advantages will become apparent from the following description with reference to the attached drawings.

STRUCTURE OF THE INVENTION (1) Technical measure

This invention relates to a clutch which carries out a releasing operation by pulling a release bearing away from a flywheel by means of a release lever interconnected to a clutch pedal. The clutch disc is spline fitted onto a transmission side input shaft. A sleeve is provided on an outer periphery of the input shaft. A release bearing is secured to a transmission side end of the sleeve. A flanged portion extending to a radial outside of the sleeve is formed at a flywheel side end of the sleeve. A load transmitting retainer which transmits a pressing force from the sleeve to the clutch disc is installed on and press fitted onto the flanged portion so as to be retained thereat. A flanged portion side spherical surface and a retainer side spherical seat permits the retainer to contact with the flanged portion over the entire circumference even when the retainer is not coaxial with the sleeve and are provided between the retainer and the flanged portion. A clutch cover is provided which is fastened to the flywheel and covers a pressure plate for pressing the clutch disc. A spring member is disposed between the clutch cover and the retainer. A lever for transmitting a spring force of the spring member is provided between the retainer and the pressure plate, and a connecting member which connects the clutch cover and the retainer so as to allow the retainer to slide in its axial direction is provided between the retainer and the clutch cover.

(2) Function

Because the retainer contacts with the sleeve through the flanged portion side spherical surface and the sleeve side spherical seat, the spherical surface contacts with the spherical seat over the entire circumference even when the misalignment arises between the retainer and the sleeve. Vibration transmitted from the retainer to the sleeve is not generated.

BRIEFn DESCRIPTION OF THE DRAWINGS

Figure 2:
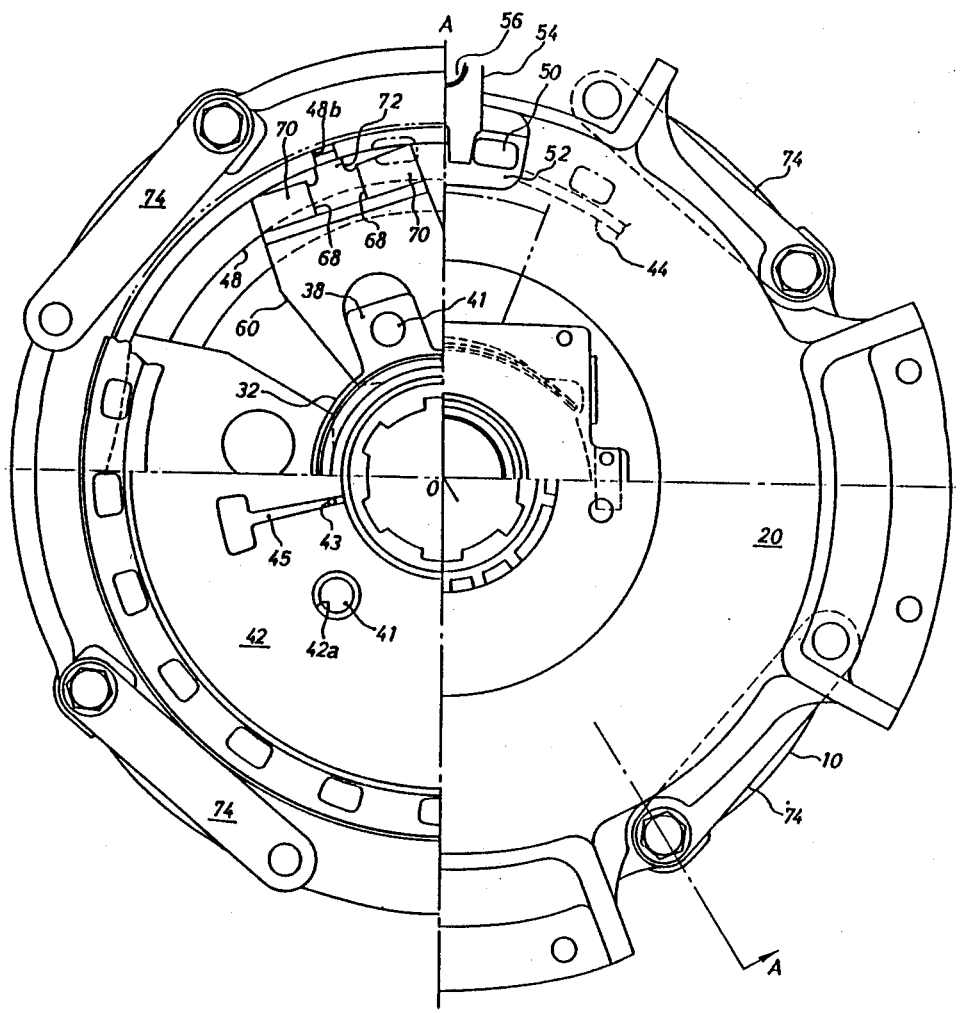
Figure 3:
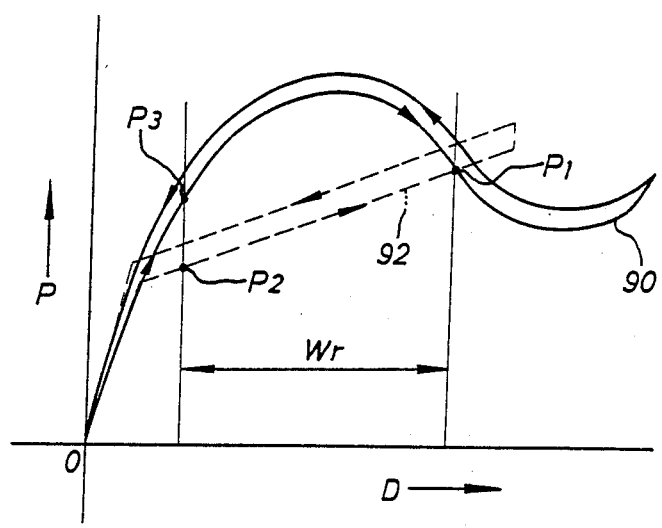
Figure 4:
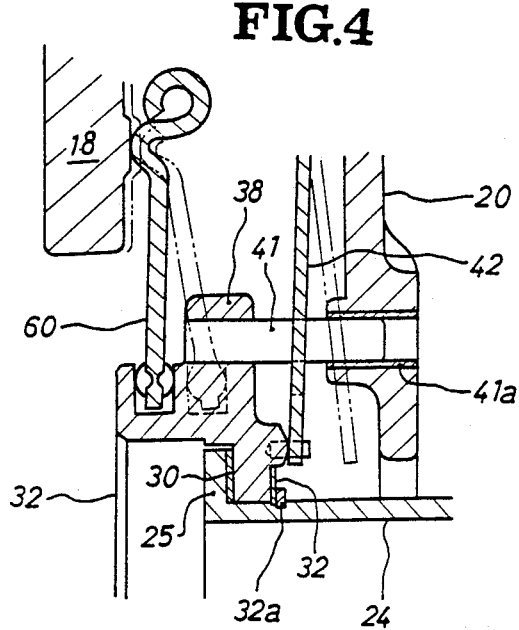
Figure 4A:
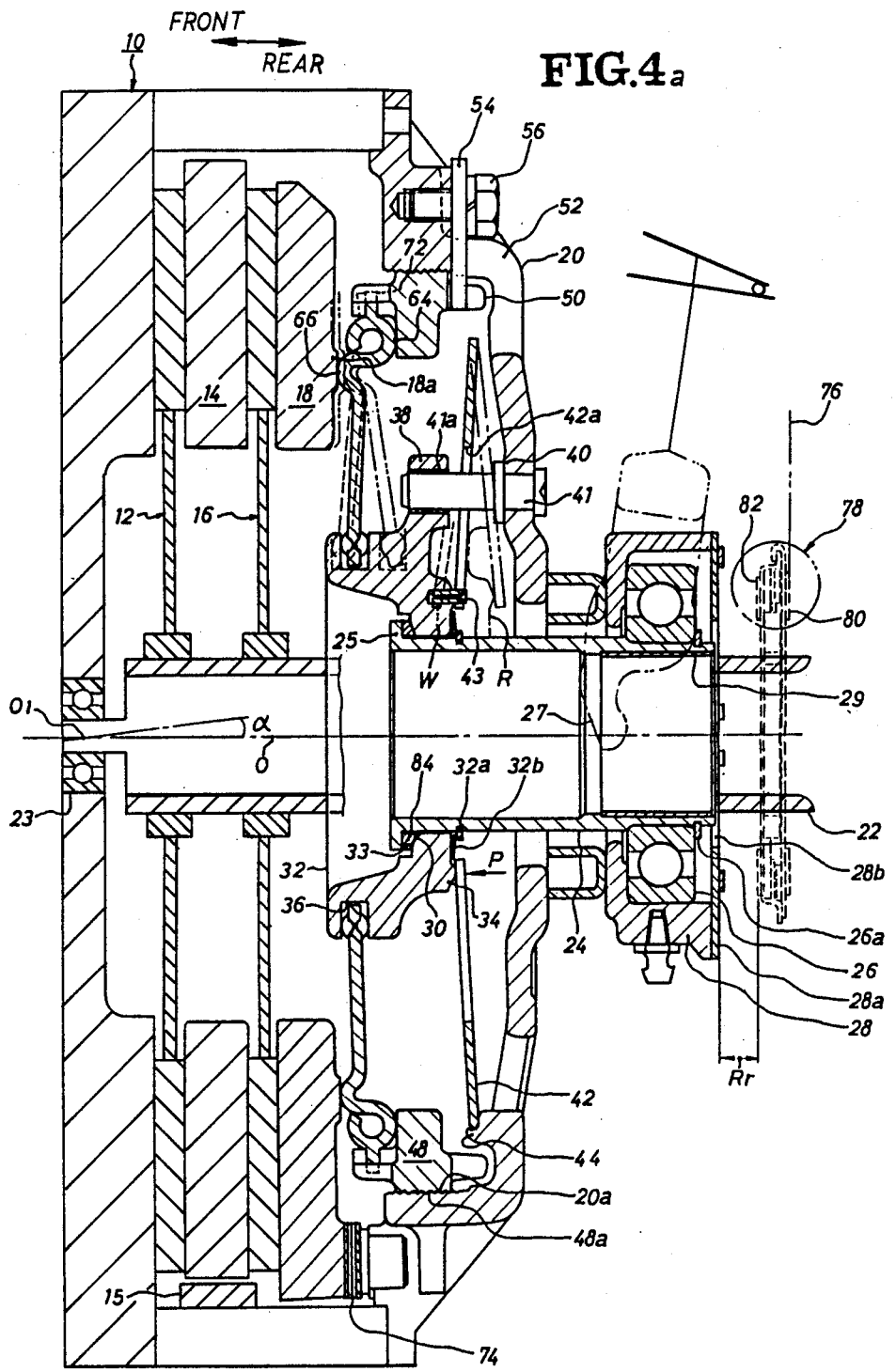
Figure 4B:
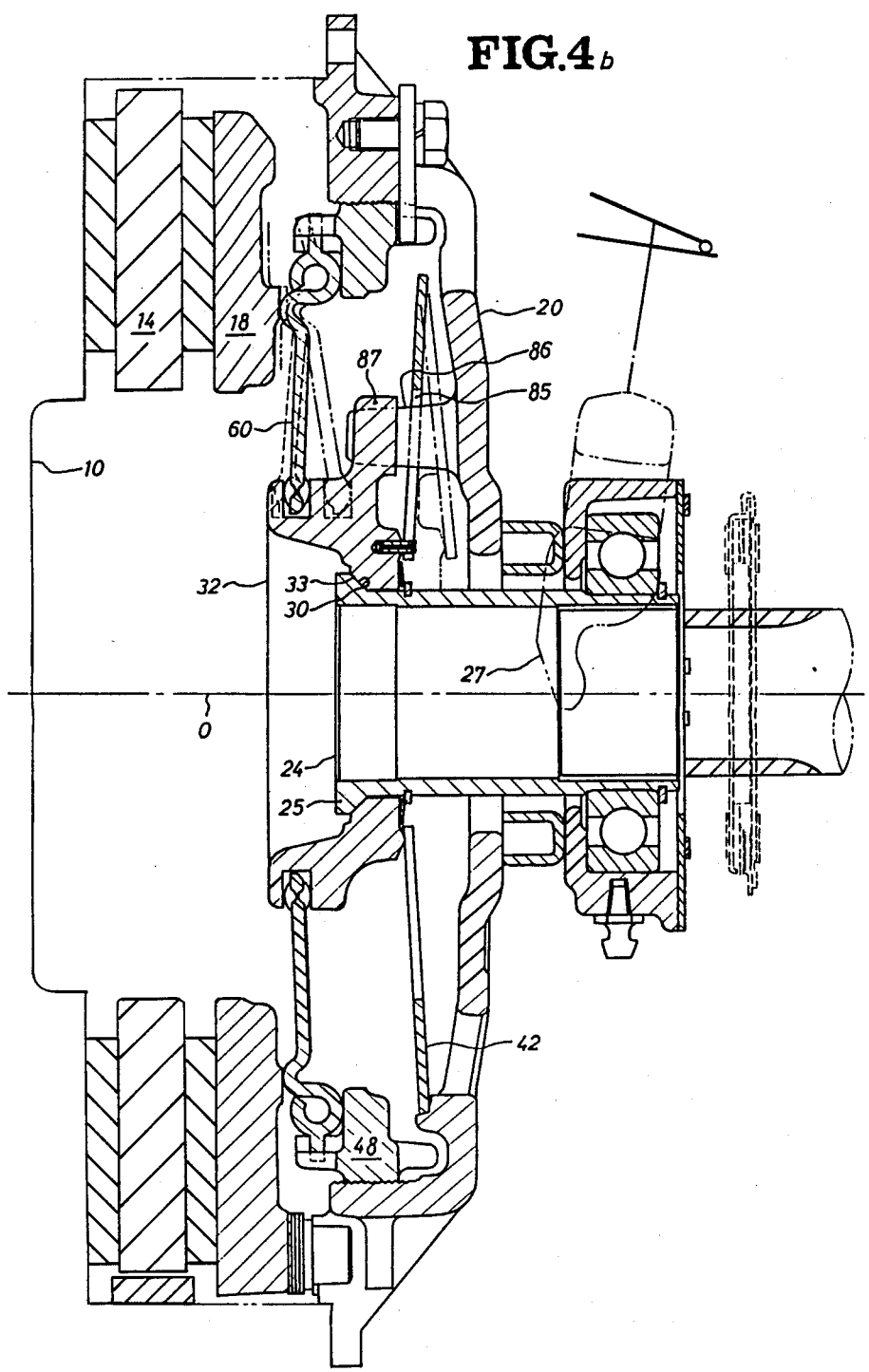
Figure 4C:
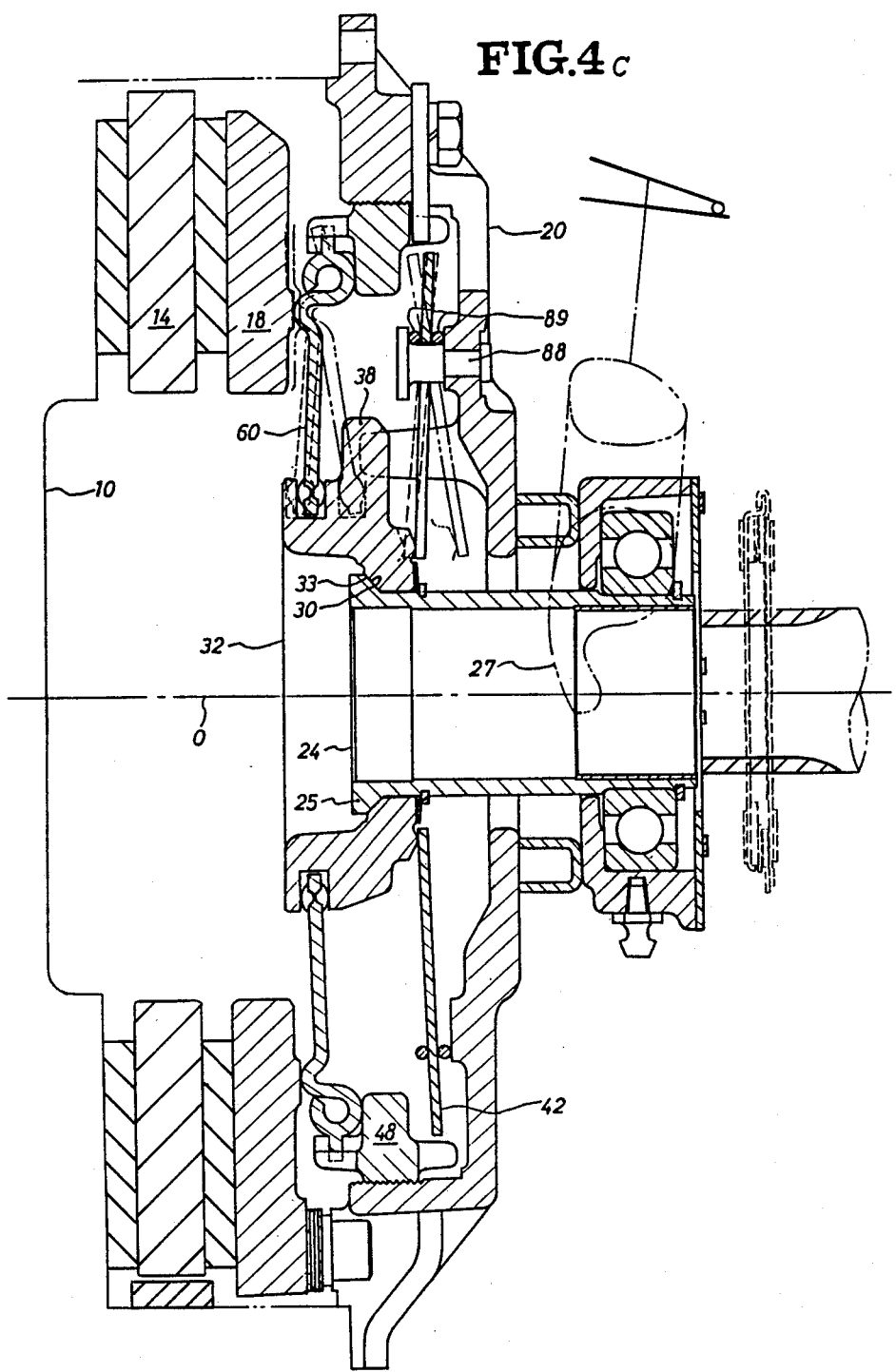
Figure 4D:
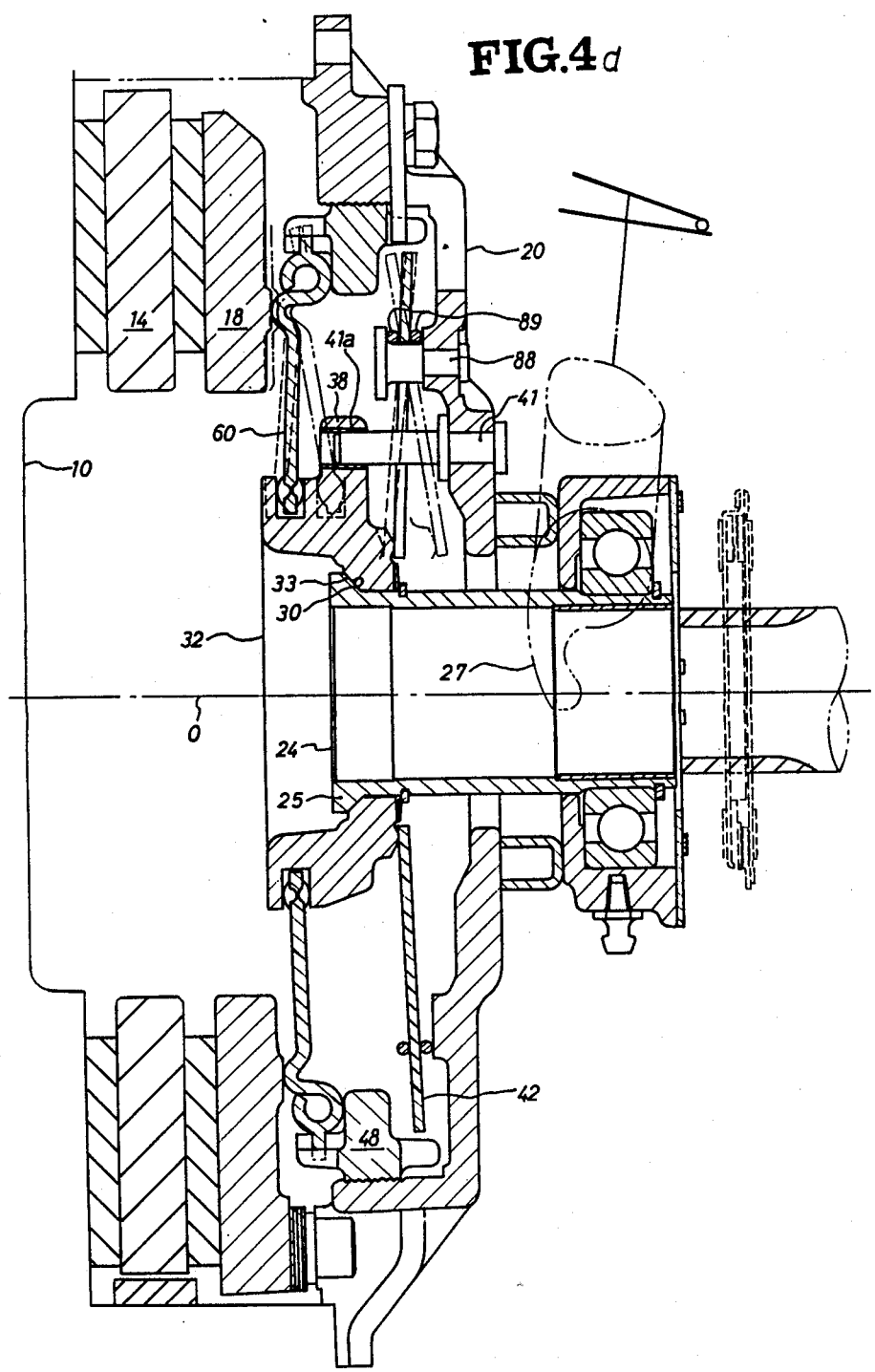

FIG. 1 is a vertical sectional view of a clutch according to the invention. FIG. 2 is a view viewed in a direction of arrow II of FIG. 1. FIG. 3 is a graph showing a relation between a spring force and a deflection of a diaphragm spring. FIG. 4 is a vertical sectional partial view showing another embodiment of a connecting member. FIG. 4a is a vertical sectional view showing another embodiment of a spherical surface. FIG. 4b, FIG. 4c & FIG. 4d are vertical sectional views showing, respectively, further embodiments. FIG. 5 is a vertical sectional view showing a conventional embodiment. FIG. 6 is a vertical sectional view showing the arrangement of applicant's prior application.

BEST MODE FOR CARRYING OUT THE INVENTION

In FIG. 1 (sectional view taken on a, FIG. 2) showing a vertical sectional view of the clutch according to the invention, 10 is a flywheel. A clutch disc 12, an intermediate plate 14 and a clutch disc 16 are pressed on a rear surface of the flywheel 10 successively, by pressure plate 18. A pin 15 fastened to the flywheel 10 is installed at a radial outside of the intermediate plate 14. Pin 15 causes the flywheel 10 to rotate integrally with flywheel 10.

A clutch cover 20 is installed at a rear side of the pressure plate 18 so as to cover the pressure plate 18. Clutch cover 20 is made of a casting and formed into a thick wall structure. The clutch discs 12 and 16 are spline fitted onto an input shaft 22 of a rear stage transmission.

A tip end of the input shaft 22 is carried by a central part of the flywheel 10 through a pilot bearing 23.

A cylindrical sleeve 24 is fitted onto a radial outer periphery of the input shaft 22 in a manner to slide freely in its axial direction. A release bearing 26 is secured by a snap ring 26a to a rear end portion, i.e. a transmission side end portion of the sleeve 24. A bearing holder 28 covering the release bearing 26 is installed at an outside of the release bearing 26, and a presser plate 28a is fastened to a rear end face of the bearing holder 28. A through hole 28b on presser plate 28a allows input shaft 22 to pass through.

A thin bush 29, which permits the input shaft 22 to rotatably fit therein, is fitted in an inner peripheral surface of the rear end portion of the sleeve 24.

Release lever 27 is interconnected to a clutch pedal for moving release bearing 26 in the axial direction.

A flanged portion 25 extending to a radial outside of the sleeve 24 is formed at a front end portion of the sleeve 24. An arcuate surface 30 is formed at a rear end surface of the flanged portion 25. Arcuate seat 33 of the retainer 32 presses on the surface 30.

The arcuate surface 30 is formed as a part of a spherical shape having its center at a center 01 of the pilot bearing 23 and projecting toward a rear side of the clutch. The center of the arcuate surface 30 can be located not only on the center 01, but at other positions along a center line 0. Further, as shown by two-dot chain lines of FIG. 1, a concave arcuate surface 30x may be used and mated with an arcuate seat 33x.

However, since a deflection angle having its center at the center 01 frequently occurs in the input shaft 22 carried by the pilot bearing 23 as mentioned above, it is most preferable to let the center of the arcuate surface 30 coincide with the center 01.

Moreover, the retainer 32 is urged forward by a coned disc spring 32b, and the coned disc spring 32b is held by a snap ring 32a. The sleeve 24 is made, for instance, of a forging.

The sleeve 24 moves backward together with the release bearing 26 when release bearing 26 moves backward, so that the retainer 32 is also pulled backward together with the sleeve 24 to a position R shown by a two-dot chain line in FIG. 1.

The retainer 32 is made of a casting for instance, and formed into an approximately annular shape. A presser part 34 is formed on a rear side end face of the retainer 32 over the entire circumference, and an annular groove 36 is formed on a front side end face thereof. Projections 38 are integrally formed at three places, for example, on a radial outer peripheral part of the retainer 32 with equal distances left therebetween in the circumferential direction.

Correspondingly to the projection 38, a boss 40 is formed integrally on an inside face of the clutch cover 20. A pin 41 is installed between the boss 40 and the projection 38. Pin 41 connects the clutch cover 20 with the retainer 32 so that they rotate integrally each other. The front end of the pin 41 fits in the projection 38 through a bush 41a so as to slide freely therein, rear end of the pin 41 is secured to the boss 40 by a "crimp work".

An approximately disc-like diaphragm spring 42 (spring member) is installed between the clutch cover 20 and the projection 38 as illustrated by FIG. 1. An outer peripheral portion of the diaphragm spring 42 is held to the clutch cover 20 by a projection 44 of the clutch cover 20. As shown by FIG. 2, the projection 44 is formed into an annular shape over an approximately entire circumference except for a range of an opening 52 of the clutch cover 20.

An inner peripheral part of the diaphragm spring 42 presses on a presser part 34 of the retainer 32. A hole 42a (FIG. 2), permitting the pin 41 to pass through, is formed at a position corresponding to the pin 41 of the diaphragm spring 42.

Further, the inner peripheral part of the diaphragm spring 42 is locked to the presser part 34 by a roll pin 43 installed at a sectional position which is circumferentially different from the sectional position of FIG. 1. The roll pin 43 fits in a slit 45 of the diaphragm spring 42 as illustrated in FIG. 2. Roll pin 43 and slit 45 are, respectively, formed at three places spaced 120 degrees in the circumferential direction.

As illustrated in FIG. 1, a threaded part 20a is formed on an inner peripheral face of the clutch cover 20 at a radial outside of the diaphragm spring 42, and a threaded part 48a of an approximately annular adjuster ring 48 is screwed in the threaded part 20a.

Projections 50 are formed on a rear end face of the adjuster ring 48 at 24 places, for instance, with equal distances left therebetween in the circumferential direction. The projections 50 are formed on a radially outer peripheral part of the adjuster ring 48.

A hole 52 is formed on the clutch cover 20 correspondingly to the projection 50, and a lock plate 54 is secured to the hole 52 by a bolt 56. A bottom end in the figure of the lock plate 54 fits in the projection 50, and the adjuster ring 48 and the clutch cover 20 are integrally connected by the lock plate 54 so as to permit an axial positional adjustment of the adjuster ring 48.

Release levers 60 for releasing operation are provided between the pressure plate 18 and the retainer 32 at six places with equal distances left therebetween in the circumferential direction. An inner peripheral side fulcrum 62 of the lever 60 fits in an annular groove 36, and an outer peripheral side fulcrum 64 presses on a front end face of the adjuster ring 48. An intermediate fulcrum 66 presses on a fulcrum land 18a of the pressure plate 18. A lever ratio between the inner peripheral side fulcrum 62, the outer peripheral side fulcrum 64 and the intermediate fulcrum 66 is set to L1:L2.

The above-mentioned lever 60 is a component made by a plate work, for example. As illustrated by FIG. 2, two cut lines 68 are formed at a radially outer peripheral part of the lever 60, outside pieces 70 of outer parts are bent to form said outer peripheral side fulcrum 64 and the intermediate fulcrum 66 (FIG. 1), and a central piece 72 of central part extending in a radial outside is fitted in a recession 48b of the adjuster ring 48.

Lever 60 is disclosed in details in U.S. patent application No. 016,686, West German patent application No. 37 05 484.8, and British patent application No. 87 04 041 all based on Japanese patent application No. 61-36034 applied by the applicant of the present invention.

Well-known circumferentially extending strap plates 74 are disposed between the clutch cover 20 and an outer peripheral part of the pressure plate 18 at four places with equal distances left therebetween in the circumferential direction.

Further, an inertial brake 78 is interposed between the presser place 28a and the transmission side end face 76 of FIG. 1 so as to spline fit onto the input shaft 22. The inertial brake 78 has facings 80 & 82 on both end faces thereof, and a release clearance Rr is provided between the facing 82 and the presser plate 28a.

Function will be described hereunder. The sleeve 24 consecutively contacts with the retainer 32 over the entire circumference through the spherical surface 30 and the spherical seat 33. Therefore, a fine angle $\alpha$ is absorbed by the spherical surface 30 and the spherical seat 33 to permit the flanged portion 25 of the sleeve 24 to contact with the retainer 32 over the entire circumference even when the sleeve 24 becomes not coaxial with the retainer 32 in the radial direction, as well as even when the center line 0 of the sleeve 24 deflects by a fine angle $\alpha$ around the center 01 of said pilot bearing 23.

Consequently, the sleeve 24 does not contact with the retainer 32 only at a part of the circumference, as encountered in the prior art of FIG. 6 so that the vibration will not be generated between the sleeve 24 and retainer 32.

Further, in the foregoing embodiment as compared with FIG. 5, the clutch cover 20 is connected to the retainer 32 by the pin 41 so that it becomes unnecessary to mill a tab 105 as in a conventional case and a manufacturing cost is reduced.

Moreover, the retainer 32 is pressed on the flanged portion 25 of the sleeve 24 through the spherical surface 30 by the spring force of the coned disc spring 32b so that the sleeve 24 is coupled to the retainer 32. Accordingly, it becomes unnecessary to cut the spline by aligning the circumferential angle to the sleeve 24 as in a conventional case and the manufacturing cost is reduced.

In the initial state of setting, as shown by the solid line of FIG. 1, the spring force P of the diaphragm spring 42 urges the presser part 34 of the retainer 32 in the forward direction. This spring force P is transmitted from the inner peripheral side fulcrum 62 of the annular groove 36 to the lever 60 and multiplied by the lever ratio of L1:L2 to about three times, for example, to be transmitted from the intermediate fulcrum 66 to the fulcrum land 18a as the pressing force on the clutch discs 12 and 16.

Because the diaphragm spring 42 is disposed in an approximately flat position under this state, the diaphragm spring 42 is scarcely affected by a centrifugal force even in a high speed rotation so that there in no possibility of reduction in the pressing force on the clutch discs 12 and 16 due to the centrifugal force.

Furthermore, the inner peripheral part of the diaphragm spring 42 is locked by the roll pin 43 to the presser part 34 of the retainer 32 so that the diaphragm spring 43 rotates integrally with the retainer 34.

When the clutch disc 12 and 16 are worn out due to a long term operation, the pressure plate 18 deviates to the front side and the retainer 32 deviates in the same manner. In this wear-in state, the diaphragm spring 42 takes a position W shown by a broken line of FIG. 1.

Since the outer peripheral part of the lever 60 takes a position inclining backward under this state, it is necessary to remove the lock plate 54 and then screw the adjuster ring 48 in the forward direction to keep the lever 60 at the normal position.

The spring characteristic of the diaphragm spring 42 forms an upwardly concave curve within a range of wear-in clearance Wr which corresponds to a wear amount of the clutch discs 12 and 16, as shown by a characteristic 90 of FIG. 3 representing a relation between deflection D and spring force P. Accordingly, the spring force P of the diaphragm spring 42 becomes larger than that represented by a characteristic 92 of the conventional coil spring 100 (FIG. 5) so that the pressing force of the pressure plate 18 on the clutch discs 12 and 16 can be increased as compared with the conventional one.

Further, when the clutch discs 12 and 16 are worn out, the spring force P is reduced from a setting load P1 to a wear-in load P2 for the characteristic 92, but it is reduced from the setting load P2 only down to a wear-in load P3 for the characteristic 90. Therefore, a so-called wear-in load at time of the clutch discs 12 and 16 are worn out becomes large. Moreover, a releasing force required for the releasing operation is also weakened owing to the characteristic 90 so that the pressing force on the clutch pedal can be reduced.

In the releasing operation wherein the clutch pedal is pressed down, the release bearing 26 is moved backward by the release lever 27 and the sleeve 24 also slides backward together with the release bearing 26. When the sleeve 24 slides backward, the retainer 32 held by the snap ring 32a is pulled backward against the spring force P of the diaphragm spring 42 so that the diaphragm spring 42 takes a position R of FIG. 1. Since the inner peripheral side fulcrum 62 of the lever 60 moves backward around the outer peripheral side fulcrum 64 and the intermediate fulcrum 66 also moves backward in this instance, the pressure plate 18 is moved backward by the spring force of the strap 74 to release the pressed state of the clutch discs 12 and 16.

In this releasing operation, the pin 41 secured to the projection of the retainer 32 fits in the bushing 41a to slide in its axial direction.

EFFECT OF THE INVENTION

In the clutch according to the present invention as described above, the sleeve 24 consecutively contacts with the retainer 32 over the entire circumference through the spherical surface 30 and the spherical seat 33. Consequently, the deflection angle $\alpha$ can be absorbed by the spherical surface 30 and the spherical seat 33 and the flanged portion 25 of the sleeve 24 can make contact with the retainer 32 smoothly over the entire circumference even when the sleeve 24 is deviated from the retainer 32 in the radial direction, as well as even when the center line 0 of the sleeve 24 is deflected by the fine angle $\alpha$ around the center 01 of pilot bearing 23.

Therefore, the sleeve 24 does not contact with the retainer 32 at a part of circumference as encountered in the prior art of FIG. 6, so that the generation of vibration between the both can be avoided and the vibration is not transmitting to the clutch pedal.

ANOTHER EMBODIMENT

The most preferable embodiment for carrying out the invention has been described above in details, however, the combination and arrangement of components for the preferable embodiment can be changed variously without conflicting with the claims put forward later.

(1) The present invention is not limited to the above-mentioned embodiment, but another one may be employed. As illustrated in FIG. 4, a tip end of the pin 41 may be secured to the retainer 32 by a "press fit" work or a "crimp" work and a rear end of the pin 41 may be fitted freely slidingly in the bushing 41a installed in the boss 40.

(2) Further, as illustrated in FIG. 4a, an approximately annular friction washer 84 made of a sintered alloy for instance may be interposed between the flanged portion 25 and the retainer 32 in such a manner as exchangeable by means of the press fit etc. for example, and the spherical surface 30 may be formed on a rear face of the friction washer 84, so that the friction washer 84 may be exchanged if the spherical surface 30 is worn out due to a long term operation.

(3) The present invention is not limited to the case that the pin 41 is used for the connecting member which connects the clutch cover 20 with the retainer 32, but it may be applicable to a clutch wherein the both components are connected by another connecting member such as the tab 105 of FIG. 5 etc.

Namely, as illustrated by FIG. 4b, a tab 86 may be formed integrally with the clutch cover 20 and this tab 86 may be made fit in a projection 87 of the retainer 32 so as to slide freely in the axial direction of the retainer 32. Thus, the clutch cover 20 is circumferentially coupled to the retainer 22. A hole 85 for permitting the tab 86 to pass through is made on the diaphragm spring 42.

Further, as illustrated in FIG. 4c, the diaphragm spring 42 may be held by a stud pin 88 and two wire rings 89.

Moreover, as illustrated by FIG. 4d, the stud pin 88 and the two wire rings 89 may be combined with the pin 41.

(4) The spring member according to the present invention is not limited to the above-mentioned approximately disc-like diaphragm spring 42, but the coil spring 100 as shown by FIG. 5 for example may be used therefor.

What is claimed is:

1. A pull-type clutch having a clutch disc mounted between a flywheel and a pressure plate in which releasing and engaging operations are carried out by pulling a release bearing away from said flywheel by means of a release lever interconnected to a clutch pedal for releasing said clutch and for releasing said release bearing to return toward said flywheel for engaging said clutch; characterized by a clutch disc spline fitted onto an output shaft at a transmission side of said clutch disc, a sleeve on a outer periphery of said input shaft, a release bearing secured to a transmission side end of said sleeve, a flange portion on said sleeve extending radially outwardly of said sleeve at a flywheel end of said sleeve, a load transmission retainer for transmitting a pressing force from said sleeve to said clutch disc fitted onto said sleeve into engagement with said flange portion of said sleeve so as to be retained thereby, a flange portion arcuate surface and a retainer arcuate seat between said retainer and said flanged portion for maintaining contact between said arcuate surface and said arcuate seat over the entire circumferences thereof even when said retainer is not coaxial with said sleeve, a clutch cover fastened to said flywheel and covering said pressure plate, a spring member disposed between said clutch cover and said retainer, a lever between said retainer and said pressure plate for transmitting a spring force therebetween, and a connecting member between said retainer and said clutch cover for connecting said clutch cover with said retainer and for allowing said retainer to slide in the axial direction of said retainer.

2. A clutch as set forth in claim 1, in which said spherical surface is formed integrally on an end face of said flanged portion opposite to said flywheel so as to project in a direction opposite to said flywheel.

3. A clutch as set forth in claim 1, in which said spherical surface is formed integrally in a retainer side end face of an approximately annular friction washer interposed between said retainer and said flanged portion so that said spherical surface projects in a direction opposite to the flywheel.

4. A clutch as set forth in claim 1 or claim 2, in which said spherical surface has its center on a line connecting a flywheel center and an axis of the input shaft a transmission fitted in said sleeve.

5. A clutch set forth in claim 1, in which a pin forming the connecting member is secured to the retainer and carried by the clutch cover through a bushing so as to slide freely in its axial direction.

6. A clutch as set forth in claim 1, in which the pin forming the connecting member is secured to the clutch and carried by the retainer through a bushing so as to slide freely in its axial direction.

7. A clutch as set forth in claim 1, in which the connecting member is composed of a lug provided projectingly on an inside face of the clutch cover, said lug being fitted in a part of the retainer so as to slide freely in an axial direction of the retainer, said lug being coupled to the retainer in its circumferential direction.

8. A clutch as set forth in claim 1, in which the retainer is pressed toward the flywheel by means of a spring force of an annular spring member installed on an outer periphery of the sleeve.

9. A clutch as set forth in claim 1, in which the spring member is a diaphragm spring held to the clutch cover through a stud pin and wire rings.

10. A pull-type clutch having a clutch disc mounted between a flywheel and a pressure plate in which releasing and engaging operations are carried out by pulling a release bearing away from said flywheel by means of a release lever interconnected to a clutch pedal for releasing said clutch and for releasing said release bearing to return toward said flywheel for engaging said clutch; characterized by a clutch disc spline fitted onto an output shaft at a transmission side of said clutch disc, a sleeve on a outer periphery of said input shaft, a release bearing secured to a transmission side end of said sleeve, a flange portion on said sleeve extending radially outwardly of said sleeve at a flywheel end of said sleeve, a load transmission retainer for transmitting a pressing force from said sleeve to said clutch disc fitted onto said sleeve into engagement with said flange portion of said sleeve so as to be retained thereby, a flange portion arcuate surface and a retainer arcuate seat between said retainer and said flanged portion for maintaining contact between said arcuate surface and said arcuate seat over the entire circumferences thereof even when said retainer is not coaxial with said sleeve, a clutch cover fastened to said flywheel and covering said pressure plate, a spring member disposed between said clutch cover and said retainer, a lever between said retainer and said pressure plate for transmitting a spring force therebetween, and a connecting member between said retainer and said clutch cover for connecting said clutch cover with said retainer and for allowing said retainer to slide in the axial direction of said retainer, said arcuate surface being integrally formed on an end face of said flanged portion opposite to said flywheel and projecting in a direction opposite to said flywheel, said clutch disc comprising two discs spline fitted onto said input shaft fitted in said sleeve, and an intermediate plate between said two discs.

* * * * *

UNITED STATES PATENT AND TRADEMARK OFFICE
CERTIFICATE OF CORRECTION

PATENT NO.  : 4,890,708
DATED       : January 2, 1990
INVENTOR(S) : KITANO et al It is certified that error appears in the above-identified patent and that said Letters Patent is hereby corrected as shown below:

On the cover page, Item [73], "Kabushiki Kaisha Daikin Sesisakusho" should read --Kabushiki Kaisha Daikin Seisakusho--.

Signed and Sealed this

Twenty-eighth Day of May, 1991

Attest:

HARRY F. MANBECK, JR.

Attesting Officer

Commissioner of Patents and Trademarks